US012690012B2

(12) United States Patent　(10) Patent No.:　US 12,690,012 B2
Agrawal　(45) Date of Patent:　Jul. 21, 2026

(54) USER EQUIPMENT AIDED EARLY PAGING INDICATOR CLUSTERING

(71) Applicant: QUALCOMM Incorporated, San Diego, CA (US)

(72) Inventor: Ashutosh Vinod Agrawal, Bengaluru (IN)

(73) Assignee: QUALCOMM Incorporated, San Diego, CA (US)

( * ) Notice: Subject to any disclaimer, the term of this patent is extended or adjusted under 35 U.S.C. 154(b) by 337 days.

(21) Appl. No.: 18/499,982

(22) Filed: Nov. 1, 2023

(65) Prior Publication Data

US 2025/0142528 A1　May 1, 2025

(51) Int. Cl.
　H04W 68/02　　(2009.01)
　H04W 48/16　　(2009.01)
　H04W 68/00　　(2009.01)

(52) U.S. Cl.
　CPC ......... H04W 68/005 (2013.01); H04W 48/16 (2013.01); H04W 68/02 (2013.01)

(58) Field of Classification Search
　CPC ... H04W 68/005; H04W 48/16; H04W 68/02; H04W 68/025
　See application file for complete search history.

(56) References Cited

U.S. PATENT DOCUMENTS

| | | | | |
|---|---|---|---|---|
| 8,897,818 | B2 | 11/2014 | Weng et al. | |
| 2020/0053695 | A1* | 2/2020 | Charbit | H04W 84/022 |
| 2023/0113113 | A1* | 4/2023 | He | H04W 68/02 |
| | | | | 455/458 |
| 2023/0397167 | A1* | 12/2023 | Murray | H04W 68/025 |
| 2024/0373499 | A1* | 11/2024 | Agiwal | H04W 48/12 |

FOREIGN PATENT DOCUMENTS

| | | | | |
|---|---|---|---|---|
| WO | WO-2022081834 A1 * | 4/2022 | | H04W 68/025 |
| WO | WO-2023048493 A1 * | 3/2023 | | H04W 68/02 |

OTHER PUBLICATIONS

International Search Report and Written Opinion—PCT/US2024/048581—ISA/EPO—Jan. 13, 2025.
Nokia, et al., "Evaluation of Potential Paging Enhancements", 3GPP TSG RAN WG1 #104e, R1-2101664, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 18, 2021, 12 Pages, XP051971819, the whole document.

* cited by examiner

*Primary Examiner* — Said M Elnoubi
(74) *Attorney, Agent, or Firm* — Harrity & Harrity, LLP

(57)　　　　　ABSTRACT
Various aspects of the present disclosure generally relate to wireless communication. In some aspects, a user equipment (UE) may transmit a subgroup preference indication that indicates a UE-preferred subgroup of an early paging indicator (EPI). The UE may receive an EPI subgroup assignment for the I. Numerous other aspects are described.

30 Claims, 13 Drawing Sheets

Receive an indication of a UE-preferred subgroup of an early paging indicator (EPI)

Transmit a subgroup preference indication that indicates the UE-preferred subgroup of the EIP Receive an EPI subgroup assignment for the EPI

810

820

830

800

910 — Receive a subgroup preference indication that is associated with a user equipment (UE), the subgroup preference indication indicating a UE-preferred subgroup of an early paging indicator (EPI)

920 — Transmit an EPI subgroup assignment that is associated with the EPI

900

1100

1108

Reception Component 1102

Communication Manager 1106

Transmission Component 1104

USER EQUIPMENT AIDED EARLY PAGING INDICATOR CLUSTERING

FIELD OF THE DISCLOSURE

Aspects of the present disclosure generally relate to wireless communication and to techniques and apparatuses for user equipment aided early paging indicator clustering.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, a method of wireless communication performed by a user equipment (UE) includes transmitting a subgroup preference indication that indicates a UE-preferred subgroup of an early paging indicator (EPI); and receiving an EPI subgroup assignment for the EPI.

In some implementations, a method of wireless communication performed by a network node includes receiving a subgroup preference indication that is associated with a UE, the subgroup preference indication indicating a UE-preferred subgroup of an EPI; and transmitting an EPI subgroup assignment that is associated with the EPI.

In some implementations, an apparatus for wireless communication at a UE includes one or more memories; and one or more processors, coupled to the one or more memories, configured to cause the UE to: transmit a subgroup preference indication that indicates a UE-preferred subgroup of an EPI; and receive an EPI subgroup assignment for the EPI.

In some implementations, an apparatus for wireless communication at a network node includes one or more memories; and one or more processors, coupled to the one or more memories, configured to cause the network node to: receive a subgroup preference indication that is associated with a UE, the subgroup preference indication indicating a UE-preferred subgroup of an EPI; and transmit an EPI subgroup assignment that is associated with the EPI.

In some implementations, a non-transitory computer-readable medium storing a set of instructions for wireless communication includes one or more instructions that, when executed by one or more processors of a UE, cause the UE to: transmit a subgroup preference indication that indicates a UE-preferred subgroup of an EPI; and receive an EPI subgroup assignment for the EPI.

In some implementations, a non-transitory computer-readable medium storing a set of instructions for wireless communication includes one or more instructions that, when executed by one or more processors of a network node, cause the network node to: receive a subgroup preference indication that is associated with a UE, the subgroup preference indication indicating a UE-preferred subgroup of an EPI; and transmit an EPI subgroup assignment that is associated with the EPI.

In some implementations, an apparatus for wireless communication includes means for transmitting a subgroup preference indication that indicates a UE-preferred subgroup of an EPI; and means for receiving an EPI subgroup assignment for the EPI.

In some implementations, an apparatus for wireless communication includes means for receiving a subgroup preference indication that is associated with a UE, the subgroup preference indication indicating a UE-preferred subgroup of an EPI; and means for transmitting an EPI subgroup assignment that is associated with the EPI.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
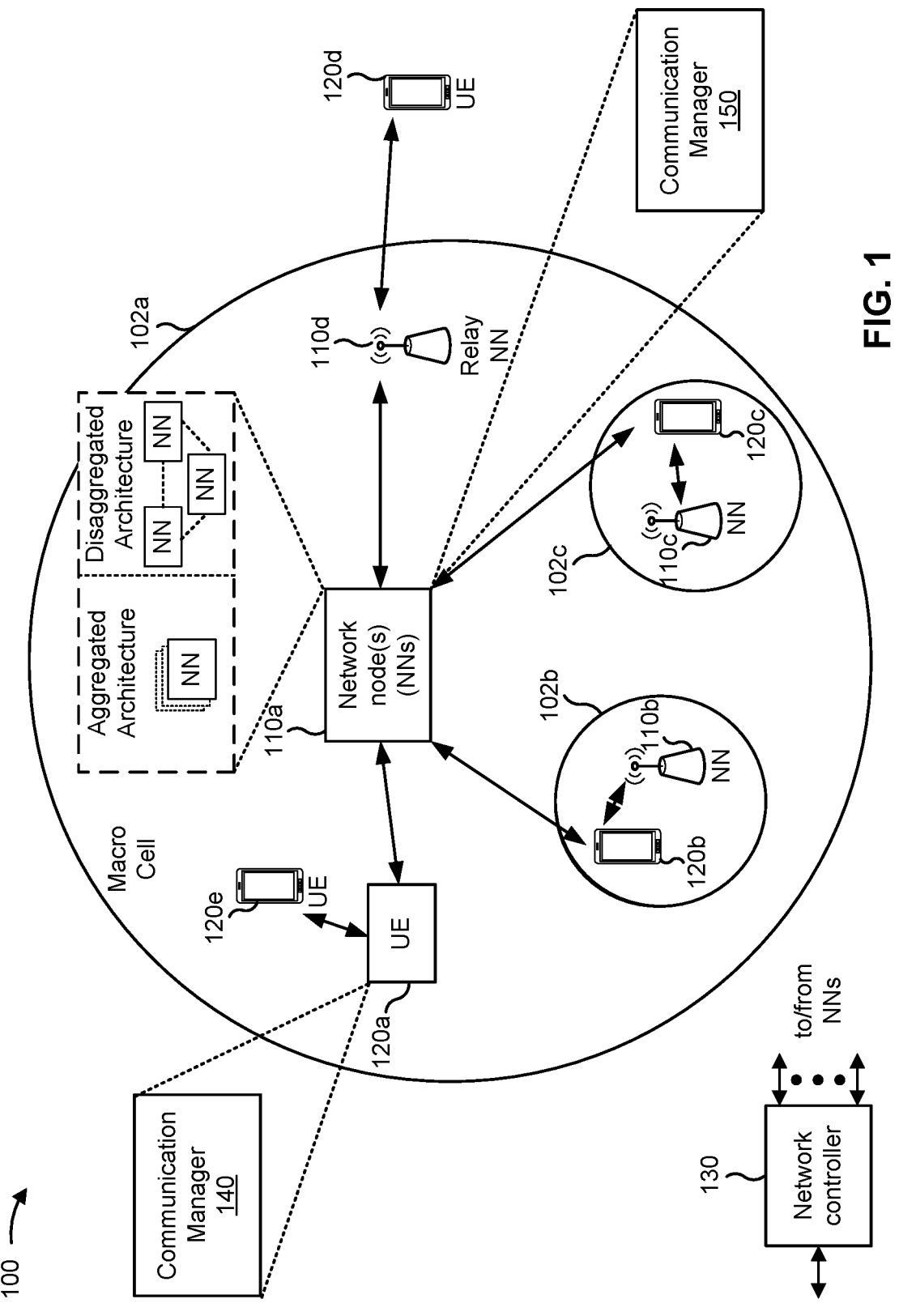
FIG. 1 is a diagram illustrating an example of a wireless network, in accordance with the present disclosure.

A wireless network may support an early paging indicator (EPI) to improve power efficiency associated with paging reception at a user equipment (UE). In some aspects, an EPI is a signal that a network node transmits to a UE before a paging occasion (PO) that is associated with the UE, and the EPI may indicate whether the UE should wake up to receive a paging message. In this way, the UE may monitor a physical downlink control channel (PDCCH) for an EPI that indicates to wake up to receive a paging message. In some aspects, the UE may be configured to monitor the PDCCH using less hardware and/or less power relative to monitoring and/or decoding a physical downlink shared channel (PDSCH). In cases where an EPI is not transmitted and/or an EPI indicates that there is no page intended for the UE in the associated PO, the UE may return to a low-power state in. Alternatively, when the EPI is transmitted and/or indicates that there is a pending paging message, the UE may power additional hardware and/or enable decoding processes to receive the PDSCH that carries the paging message. Thus, the use of an EPI may enable the UE to reduce power consumption by initially monitoring the PDCCH for an EPI.

"EPI clustering" may denote a network node selecting a cluster and/or subgroup of UEs and assigning the subgroup of UEs to a same EPI occasion (EPI O) and/or EPI subgroup indication. To illustrate, a group of UEs that share and/or are assigned to a same PO may be partitioned into one or more subgroups of UEs by a network node, and each subgroup of UEs may be assigned to a respective monitoring occasion (MO) within the PO. The ability to group and/or cluster multiple UEs into subgroups enables the network node to indicate paging at a subgroup resolution rather than at the PO level. The use of EPI clustering allows the UEs excluded from the subgroup to remain in an idle and/or inactive mode and preserve power resources.

In some aspects, a network node may randomly cluster and/or select the UEs to include in a subgroup. Generally, a random selection process may result in the network node selecting a cluster of UEs and/or a subgroup of UEs without considering an efficiency of the groupings or a preference. To illustrate, a random selection process may result in a subset of UEs that are related to one another (e.g., a subset of UEs that positioned on a same manufacturing line) being clustered into different subgroups. Accordingly, a page that is related to the manufacturing line (e.g., a fault page) may result in a network node transmitting an EPI to each subgroup that includes a UE of the subset, resulting in needless power consumption for other UEs that are not part of the subset of UEs. That is, randomly clustering of UEs for EPI subgroups may result in unrelated UEs being grouped together in a subgroup and, consequently, some UEs needlessly consuming power to monitor POs that are unlikely to include a page directed to that UE (e.g., at a given time).

Various aspects described herein generally relate to UE-aided EPI clustering. Some aspects relate more specifically to a network node selecting an EPI subgroup of UEs based at least in part on UE-preferred subgroup information. In some aspects, a UE may transmit a subgroup preference indication that indicates a UE-preferred subgroup of an EPI. To illustrate, the UE may be programmed with, and/or may store in memory, a value that indicates the UE-preferred subgroup. As one example, the UE may be programmed with the value during installation and/or shortly after installation as described below. In some aspects, the UE may receive an EPI subgroup assignment for the EPI, and the EPI subgroup assignment may be based at least in part on the UE-preferred subgroup.

In some aspects, a network node may receive a subgroup preference indication that is associated with a UE, and the subgroup preference indication may indicate a UE-preferred subgroup of an EPI. The network node may select an EPI subgroup that clusters two or more UEs with a same and/or common UE-preferred subgroup. In some aspects, the network node may transmit (e.g., to the UE) an EPI subgroup assignment that is associated with the EPI, and the EPI subgroup assignment may indicate the EPI subgroup to the UE.

A UE indicating a UE-preferred subgroup to a network node may enable the network node to select more optimal subgroups of UEs for EPI transmissions relative to random selection. UE-aided selection of UEs in a subgroup (e.g., by way of a UE-preferred subgroup indication) may mitigate the network node transmitting EPIs to UEs that are unlikely to receive a page at a given time, reduce power consumption at UEs (e.g., by mitigating a needless wakeup during a PO), and increase power savings in a wireless network.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120c), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120c) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHZ-114.25 GHZ), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., a UE 120) may include a communication manager 140. As described in more detail elsewhere herein, the communication manager 140 may transmit a subgroup preference indication that indicates a UE-preferred subgroup of an EPI; and receive an EPI subgroup assignment for the EPI. Additionally, or alternatively, the communication manager 140 may perform one or more other operations described herein.

In some aspects, a network node (e.g., a network node 110) may include a communication manager 150. As described in more detail elsewhere herein, the communication manager 150 may receive a subgroup preference indication that is associated with a UE, the subgroup preference indication indicating a UE-preferred subgroup of an EPI; and transmit an EPI subgroup assignment that is associated with the EPI. Additionally, or alternatively, the communication manager 150 may perform one or more other operations described herein.

As indicated above, FIG. 1 is provided as an example. Other examples may differ from what is described with regard to FIG. 1.

Figure 2:
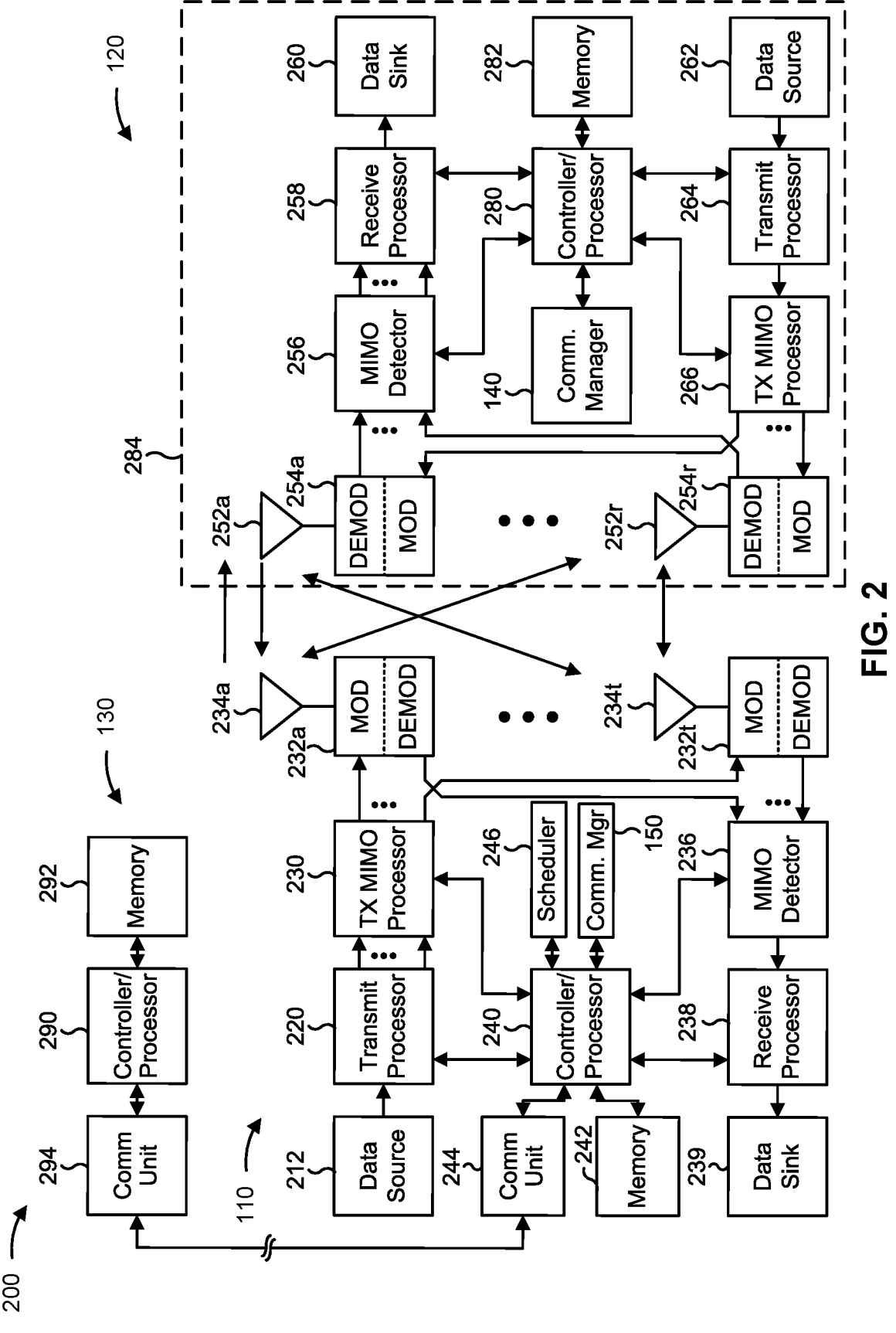
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5A-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5A-11).

The controller/processor 240 of the network node 110, the controller/processor 280 of the UE 120, and/or any other component(s) of FIG. 2 may perform one or more techniques associated with UE-aided EPI clustering, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a UE (e.g., a UE 120) includes means for transmitting a subgroup preference indication that indicates a UE-preferred subgroup of an EPI; and/or means for receiving an EPI subgroup assignment for the EPI. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., a network node 110) includes means for receiving a subgroup preference indication that is associated with a UE, the subgroup preference indication indicating a UE-preferred subgroup of an EPI; and/or means for transmitting an EPI subgroup assignment that is associated with the EPI. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
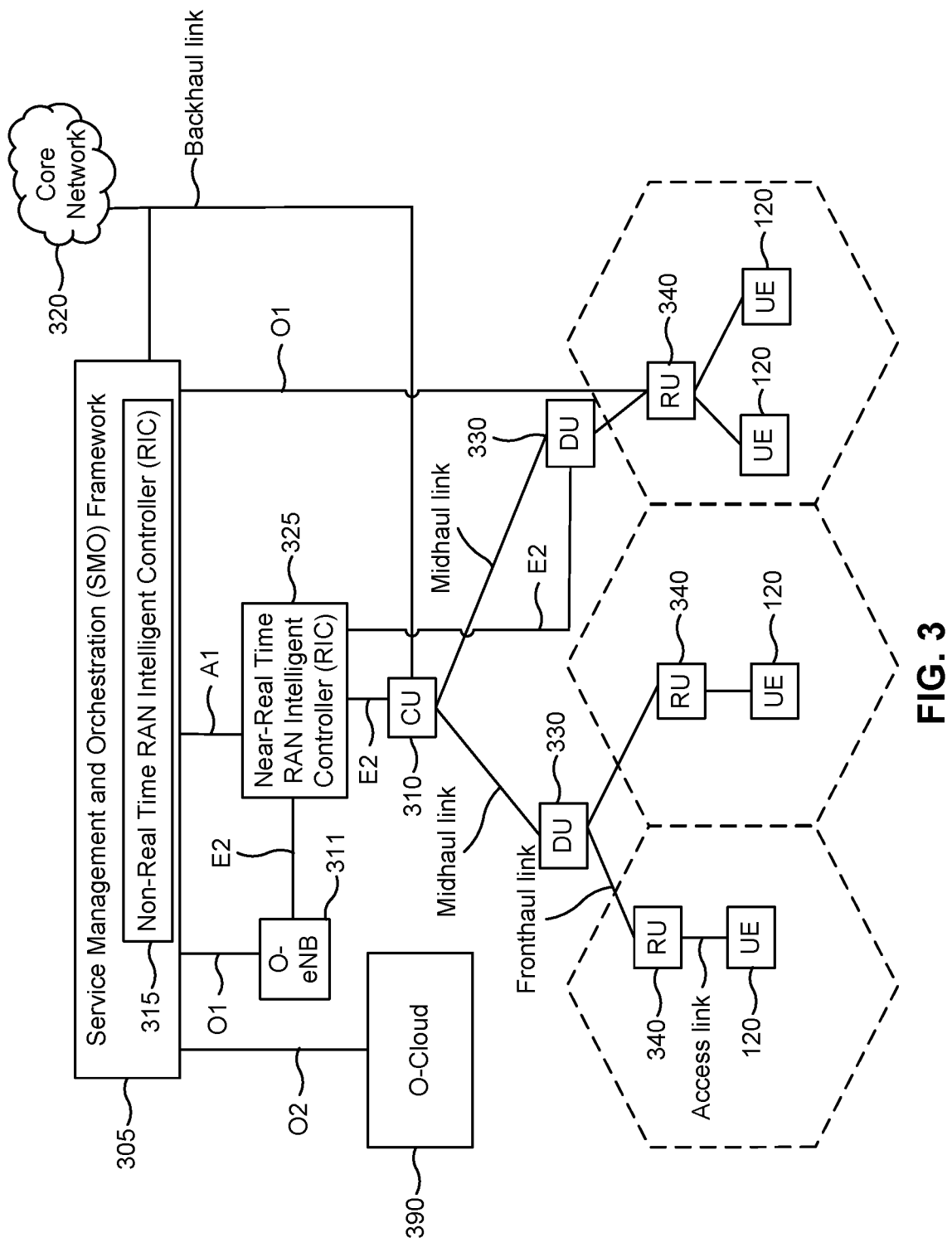
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP)

functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (IFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4A:
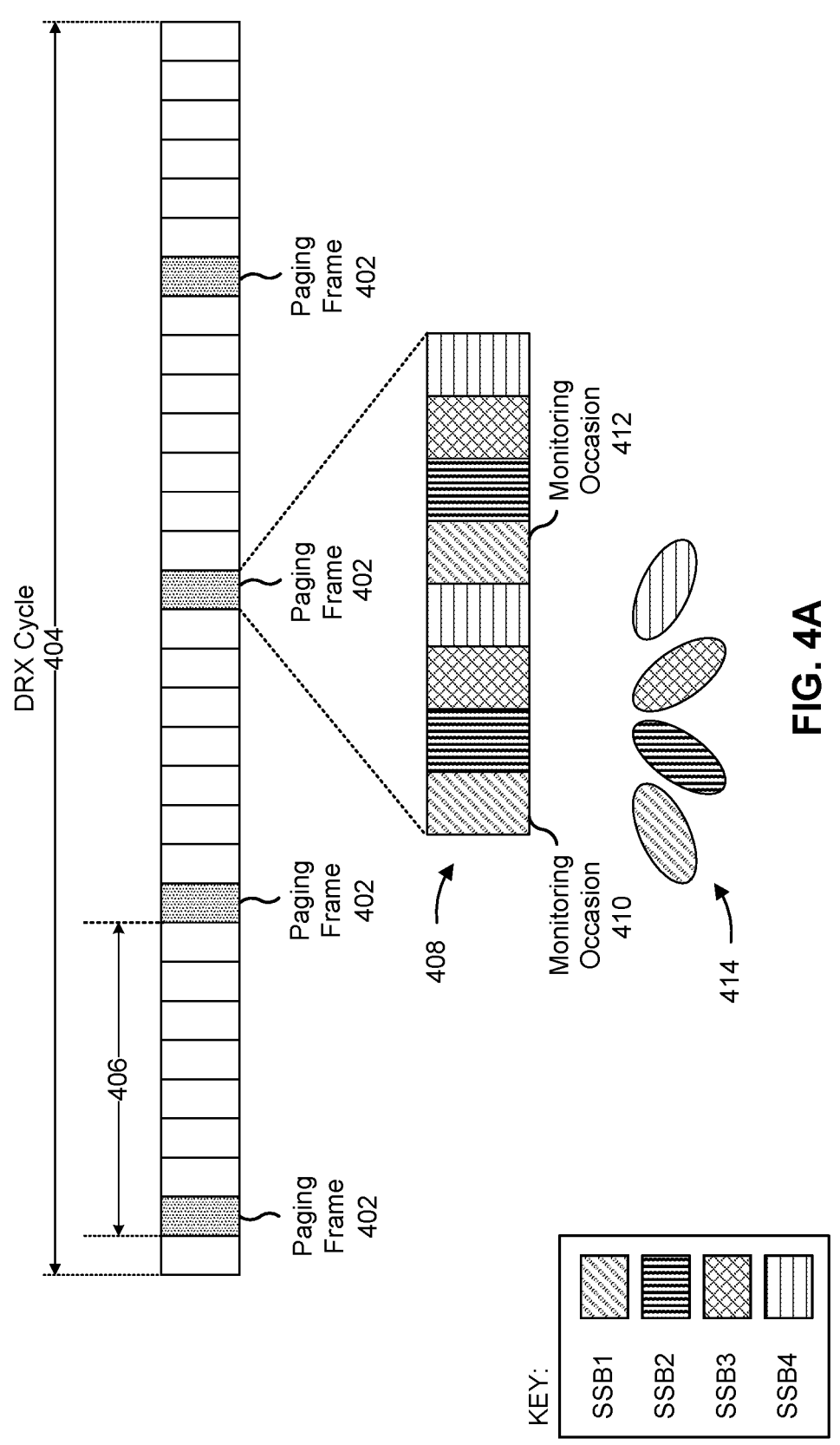
FIGS. 4A and 4B are diagrams illustrating a first example and a second example, respectively, of paging configurations, in accordance with the present disclosure.
Figure 4B:
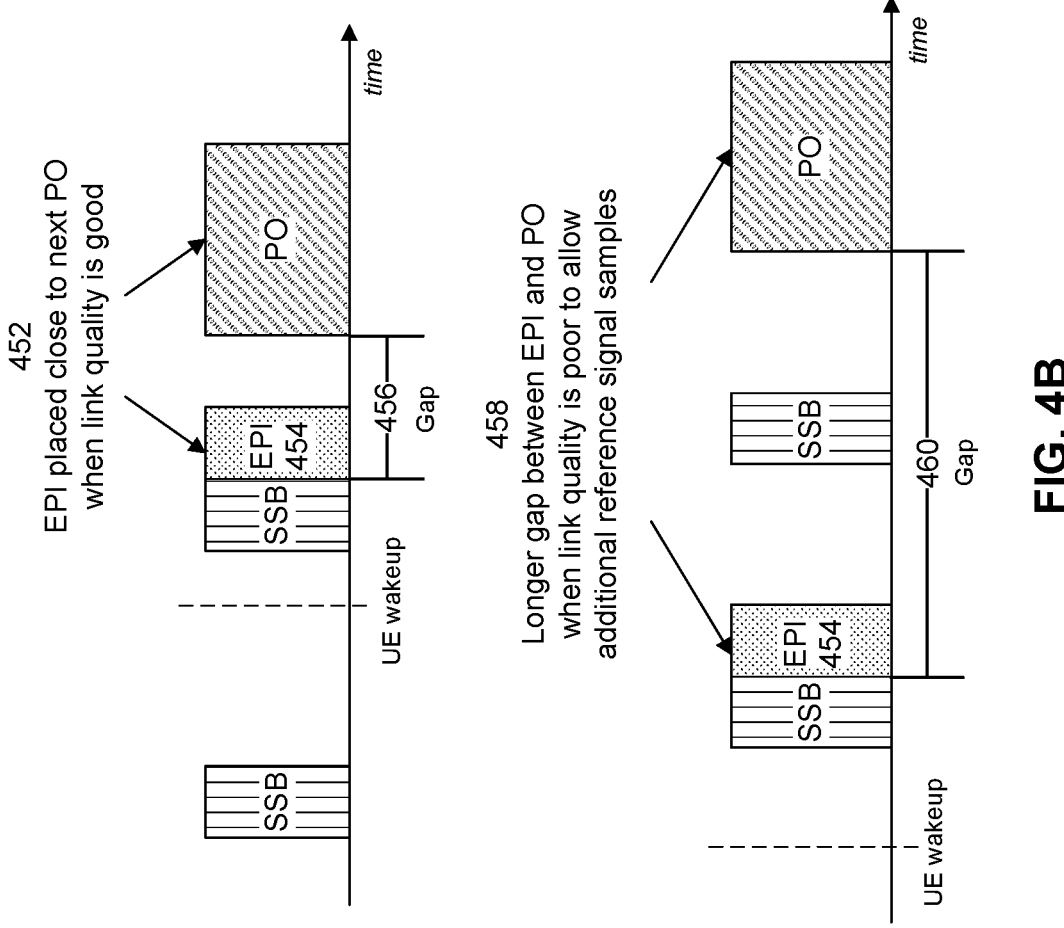
Figure 4B:
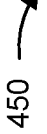
Figure 4B:
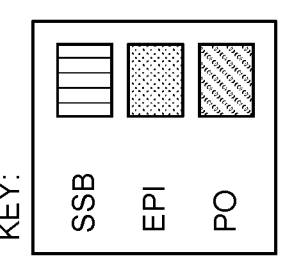

FIGS. 4A-4B are diagrams illustrating a first example 400 and a second example 450, respectively, of paging configurations, in accordance with the present disclosure. The first example 400 shown by FIG. 4A includes paging reception configuration that may be used by a UE (e.g., a UE 120) operating in an idle or inactive mode. In the first example 400, the UE monitors a control channel (e.g., a PDCCH) during a PO within a paging frame, and the UE determines whether a page is scheduled for the UE during the PO. For example, the UE may identify a paging frame 402 within a discontinuous reception (DRX) cycle 404 that is configured for the UE. The paging frame 402 may generally represent a reference frame or a starting frame for a PO associated with the UE, and a PO associated with paging frame 402 may start in the paging frame or after the paging frame based at least in part on multi-beam operation and/or PO repetition.

A network node (e.g., a network node 110) may configure paging reception for the UE by indicating a number of radio frames in a DRX cycle (e.g., the DRX cycle 404) that may have a cell-specific value or a UE-specific value. In general, a DRX cycle may be configured to include 32, 64, 128, or 256 radio frames, and the network node may configure an interval between adjacent paging frames (e.g., 1, 2, 4, 8, or 16 radio frames) and a time domain offset in frames for paging frames (e.g., from zero to N frames, where N is an integer that is one less than the interval between adjacent paging frames). In some aspects, a number of paging frames in each DRX cycle may be based at least in part on the number of radio frames and the interval between adjacent paging frames.

In FIG. 4A, the DRX cycle 404 includes 32 radio frames that are 10 milliseconds each, and adjacent paging frames have an inter-paging frame interval 406 that is 8 radio frames (or 80 milliseconds). Accordingly, the DRX cycle 404 includes four (4) paging frames (shown with a dotted pattern). The UE may identify a particular paging frame (e.g., from the four paging frames in the DRX cycle 404) that is associated with the UE, such as by identifying the particular paging frame (e.g., paging frame 402) using an identifier that is assigned to the UE.

As further shown in FIG. 4A, the UE may determine a PO 408 in the paging frame 402 that is associated with the UE, and the UE may monitor the control channel for a paging indication associated with the UE during the PO 408. A network node may configure a number of POs that is included in each paging frame (e.g., 1, 2, or 4 POs per paging frame). In some aspects, the UE may determine a PO index ($i_s$) associated with the UE based on the identifier assigned to the UE. To illustrate, each PO may contain a set of S*X consecutive PDCCH monitoring occasions, where S is a number of actual transmitted synchronization signal blocks (SSBs) indicated in a system information block (SIB) that carries information to enable access to a cell provided by the network node (e.g., SIB1) and X is a number of PDCCH monitoring occasions per SSB in a PO (e.g., 1, 2, 3, or 4). In the example 400, S=4 (e.g., SSB1 shown with a diagonal stripe, SSB2 shown with a vertical stripe, SSB3 shown with a cross-hatch pattern, and SSB4 shown with a horizontal stripe) and X=2. For example, SSB1 may be transmitted twice in the PO 408, during a first monitoring occasion 410 and a second monitoring occasion 412. As shown by reference number 414, each SSB may be transmitted via a respective beam and/or respective beam configuration. The starting PDCCH monitoring occasion number of PO $i_s$ may be configured by the network node, or based on a value of $i_s$*S*X, where the [x*S+K-th PDCCH monitoring occasion for paging in the PO corresponds to the K-th transmitted SSB, where x=0, 1, . . . , X−1, and where K=1, 2, . . . , S.

In some aspects, and based at least in part on operating an idle or inactive mode, the UE may wake up from the idle or inactive mode once in every DRX cycle during the PO associated with the UE (e.g., that is determined in the manner described above). At the time that the UE wakes up from the idle or inactive mode, the UE may be unaware of whether there will be a page for the UE during the PO. Consequently, when the UE wakes up during the PO associated with the UE, an entire receive chain is activated to enable the UE to receive and decode a page that may be carried on a PDSCH. This may increase power consumption at the UE, as components needed to receive and decode the paging PDSCH may not need to be activated if there is no page scheduled for the UE.

Accordingly, in some cases, a wireless network may support an EPI, sometimes referred to as a wakeup signal (WUS) and/or a paging early indicator (PEI), to improve power efficiency associated with paging reception at a UE. To illustrate, the second example 450 that is shown by FIG. 4B is an example paging configuration that includes the use of an EPI. In some aspects, an EPI (shown with a vertical stripe) is a special signal that a network node (e.g., a network node 110) transmits to a UE (e.g., a UE 120) before a PO (shown with a diagonal stripe) that is associated with the UE, and the EPI may indicate whether the UE should wake up to receive a paging message. In this way, the UE may monitor only a PDCCH to determine whether the network node transmitted an EPI to indicate that the UE is to wake up to receive a paging message, and may return to a low-power state in cases where an EPI is not transmitted and/or an EPI indicates that there is no page intended for the UE in the associated PO. Alternatively, when the EPI is transmitted to indicate that the UE should wake up to receive a paging message, the UE may fully wake up to receive the PDSCH carrying the paging message. In such cases, after the UE receives an EPI indicating that the UE has a page, the UE may additionally measure one or more reference signals (e.g., one or more SSBs, tracking reference signals (TRSs), and/or channel state information reference signals (CSI-RSs)) to synchronize with the network node and improve decoding of the PDSCH carrying the paging message.

For example, as shown by reference number 452, an EPI 454 may be placed relatively close in time to the next PO (shown in FIG. 4B as a first gap 456) in cases where the channel between the network node and the UE has a good link quality, as remaining time after the UE processes the reference signal transmissions may not be long enough to merit a transition to deep sleep (e.g., one reference signal sample may be enough to reliably decode the paging PDSCH). Otherwise, as shown by reference number 458, the EPI 454 may be placed further away in time from the PO as shown by a second gap 460 that is longer than the first gap 456. A longer gap and/or duration as shown by the second gap 460 may be provided between the EPI 454 and the next PO to allow the UE to obtain multiple reference signal samples between the EPI 454 and the next PO when the quality of the channel between the network node and the UE is poor.

In this way, an EPI enables the UE to wake up in two stages, which include a first stage in which the UE activates only a portion of a receive chain to monitor the PDCCH for an EPI and a second stage in which the UE activates a remaining portion of the receive chain to receive and decode the paging PDSCH (and/or measure or sample reference signals) if the EPI indicates that there is a page for the UE in the associated PO.

As indicated above, FIGS. 4A-4B are provided as an example. Other examples may differ from what is described with regard to FIGS. 4A-4B.

Figure 5A:
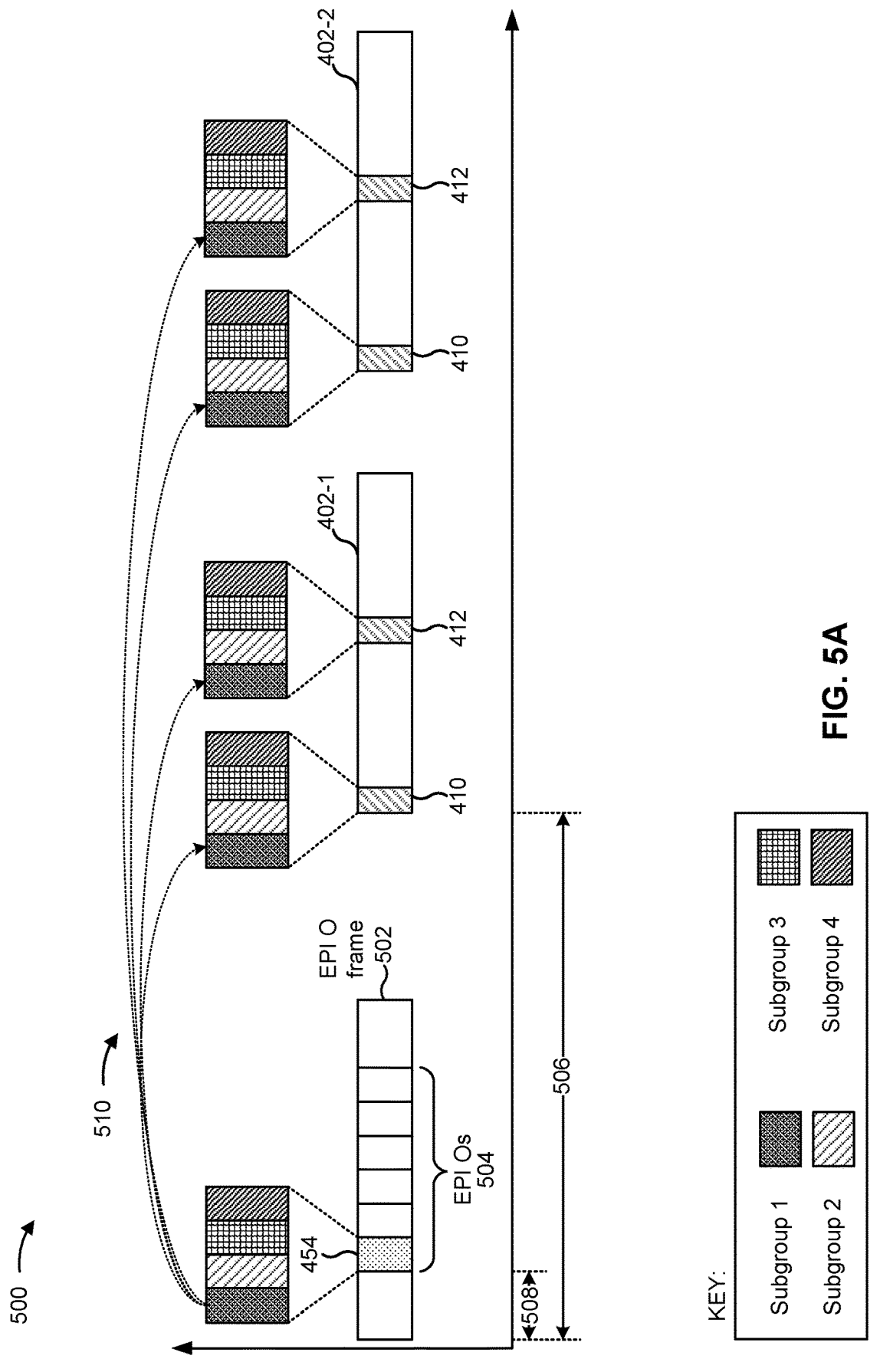
FIGS. 5A and 5B are diagrams illustrating a first example and a second example, respectively, of early paging indicator clustering, in accordance with the present disclosure.
Figure 5B:
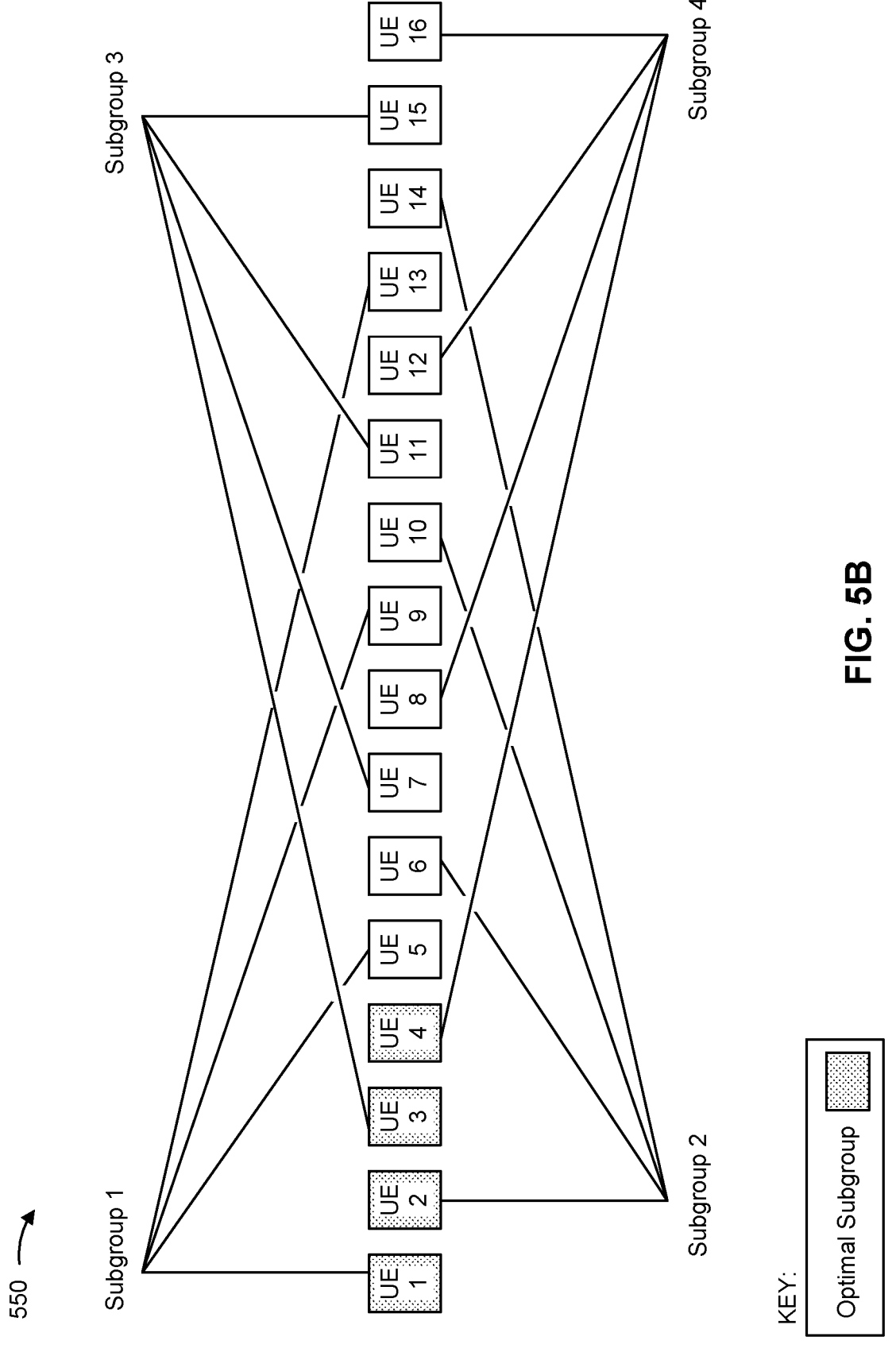

FIGS. 5A and 5B are diagrams illustrating a first example 500 and a second example 550, respectively, of EPI clustering, in accordance with the present disclosure. "EPI clustering" may denote a network node selecting a cluster and/or subgroup of UEs and assigning the subgroup of UEs to a same EPI O and/or EPI subgroup indication as described below. That is, a network node may cluster and/or group multiple UEs into K subgroups for one or more POs that the EPI covers, where K is an integer. To illustrate, a group of UEs that share and/or are assigned to a same PO may be partitioned into one or more subgroups of UEs by a network node, and each subgroup of UEs may be assigned to a respective MO within the PO. The ability to group and/or cluster multiple UEs into subgroups enables the network node to indicate paging at a subgroup resolution rather than at the PO level. That is, the network node may signal an EPI to a subset of UEs that share a same PO instead of signalling the EPI to all of the UEs that share the same PO. This allows the UEs that are not related to the EPI to remain in an idle and/or inactive mode to preserve power resources. In some aspects, "subset" and/or "subgroup" may denote a proper subset and/or a fewer number of entities (e.g., UEs) than an entirety of a group the entities are selected from.

The first example 500 includes an EPI O frame 502 that may include one or more EPI Os 504 that indicate, to one or more UEs, to monitor one or more POs for a page. As shown by FIG. 5A, the PO(s) may occur during one or more instances of the paging frame 402 as described with regard to FIG. 4A (shown by FIG. 5A as a first paging frame 402-1 and a second paging frame 402-2). In some aspects, each EPI O of the EPI Os 504 may be used to transmit and/or receive one or more EPIs (e.g., to one or more UEs and/or one or more subgroups) as described below. An example duration 506 between a start of the EPI O frame 502 and a start of the first paging frame 402-1 (e.g., an EPI O frame level offset) has a length that equates to two frames length, but other examples may utilize durations of different lengths as described with regard to FIGS. 4A and 4B. A starting EPI O of the EPI Os 504 may occur at an N symbol-level offset (where N is an integer) that is relative to a start of the EPI O frame as shown by reference number 508.

A network node may transmit an EPI that signals one or more UEs and/or one or more respective subgroups of UEs to monitor for a page during an EPI O. To illustrate, a network node may transmit the EPI 454 as described with regard to FIG. 4B during one of the EPI Os 504. In some aspects, the EPI 454 may be partitioned into K bits (shown as four (4) by FIG. 5A), and each bit in the EPI may map to a respective subgroup of UEs. Accordingly, the network node may signal a respective subgroup of UEs using the respective bit. For instance, the EPI may be configured as a bitmap, and each bit of the EPI may be used as a respective EPI subgroup indication. To illustrate, a first bit shown with diagonal stripes may map to a first subgroup, a second bit shown with horizontal stripes may map to a second subgroup, a third bit shown in solid white may map to a third subgroup, and/or a fourth bit shown with a dense dotted pattern may map to a fourth subgroup. A network node may signal each subgroup of UEs via the respective bit, such as by transmitting a trigger value (e.g., "1") in a respective bit position that maps to a particular subgroup to indicate a pending page for the particular subgroup. Alternatively, or additionally, the network node may transmit a respective inactivity value (e.g., "0") to indicate there is no pending page for the particular subgroup. While FIG. 5A shows K as having a value of four, other examples may use a different value for K.

In some aspects, a network node may select the UEs that are clustered together in a subgroup, such as by partitioning a group of UEs that are assigned to a same PO into two or more subgroups. Based at least in part on selecting the UEs included in each subgroup, the network node may indicate a respective subgroup assignment to each UE. For instance, the network node may partition a group of 16 UEs that are assigned to a same PO into four subgroups that include four UEs (e.g., subgroup 1, subgroup 2, subgroup 3, and subgroup 4).

The EPI 454 may indicate a presence (or no presence) of a page in the first paging frame 402-1 and the second paging frame 402-2. For example, as shown by reference number 510, a network node may transmit a trigger value in the first bit of the EPI 454, and the subgroup of UEs that are assigned to the first bit may monitor the first monitoring occasion 410 of the first paging frame 402-1, the second monitoring occasion 412 of the first paging frame 402-1, the first monitoring occasion 410 of the second paging frame 402-2, and the second monitoring occasion 412 of the second paging frame 402-2 for one or more page messages. Accordingly, each subgroup that receives an EPI indication (e.g., a respective trigger value) in the EPI 454 may wake up, enable additional hardware, and/or remain awake to monitor for a page during the designated occasions (shown with a diagonal pattern) within the two POs of the first paging frame 402-1 and the two POs of the second paging frame 402-2. Each subgroup that does not receive an EPI indication and/or receives a respective inactivity trigger in the EPI 454 may operate in a sleep mode during the first paging frame 402-1 and the second paging frame 402-2.

In some aspects, a network node may randomly cluster and/or select the UEs to include in a subgroup. The random clustering and/or grouping of UEs may result in additional power consumption at one or more UEs. To illustrate, the second example 550 shown by FIG. 5B demonstrates an example of EPI clustering that is performed by a network node. In the example 550, the network node may partition a group of 16 UEs (shown as UE 1 up to UE 16) into four subgroups that are associated with four EPI clusters and/or four EPI subgroups of UEs, and each UE in a subgroup may be assigned to same EPI occasion as described with regard to FIG. 5A.

In the example 550, the network node selects the subgroups of UEs in a pseudo-random manner by sequentially selecting and parsing the UEs into subgroups. That is, the network node sequentially assigns a UE to a next subgroup. For instance, the network node may assign UE 1 to subgroup 1, UE 2 to subgroup 2, UE 3 to subgroup 3, and UE 4 to subgroup 4. The network node may repeat the assignment process by assigning UE 5 to the subgroup 1, UE 6 to the subgroup 2, UE 7 to the subgroup 3, and UE 8 to the subgroup 4. Accordingly, and by iteratively following the assignment process, the subgroup 1 includes: UE 1, UE 5, UE 9, and UE 13, and the subgroup 2 includes: UE 2, UE 6, UE 10, and UE 14. Subgroup 3 includes: UE 3, UE 7, UE 11, and UE 15, and the subgroup 4 includes: UE 4, UE 8, UE 12, and UE 16. While the example 550 includes UE partitioning and/or UE clustering based at least in part on a pseudo-random process that is based at least in part on sequential ordering, other examples may utilize other random processes.

Generally, a random selection process may include the network node selecting a cluster of UEs and/or a subgroup of UEs without considering an efficiency of the groupings or a preference. To illustrate, consider an example where a service provider installs a large number of devices (e.g., IoT devices and/or IoT UEs), such as a set of wireless sensor devices in an industrial production factory. In some aspects, the set of wireless sensors (e.g., the group of 16 UEs shown by FIG. 5B) may share a same PO based at least in part on a network configuration (e.g., a number of POs per frame) and/or a latency condition (e.g., an idle DRX (IDRx) cycle and/or an extended DRX (EDRx) cycle).

At times, the service provider may have information (e.g., prior to paging) that indicates a subgroup of devices that share the same PO may be paged together, such as a subset of sensors that are positioned to monitor a same manufacturing line. In some aspects, the subset of sensors that are positioned on a same manufacturing line may be paged together based at least in part on a fault detection for that line. However, and based at least in part on a random clustering process, a network node may cluster the subset of devices on the same manufacturing line in different EPI subgroups. For instance, UE 1, UE 2, UE 3, and UE 4 may be located on a same manufacturing line, but may be randomly placed by the network node into different subgroups as shown by FIG. 5B. Accordingly, to page UE 1, UE 2, UE 3, and UE 4, the network node may indicate a respective EPI for each EPI subgroup that includes at least one of UE 1, UE 2, UE 3, and UE 4. That is, the network node may indicate an EPI for subgroup 1 based at least in part on UE 1 being included in the subgroup 1, may indicate an EPI for subgroup 2 based at least in part on UE 2 being included in the subgroup 2, may indicate an EPI for subgroup 3 based at least in part on UE 3 being included in the subgroup 3, and/or may indicate an EPI for subgroup 4 based at least in part on UE 4 being included in the subgroup 4. For instance, and as described with regard to FIG. 5A, the network node may transmit a respective trigger value in each EPI O of the EPI Os 504 that maps to the subgroup 1, the subgroup 2, the subgroup 3, and the subgroup 4. Triggering each subgroup may result in needless power consumption for UEs that are unlikely to receive a page in the PO, such as UE 5, UE 9, and UE 13 in subgroup 1. That is, randomly clustering of UEs for EPI subgroups may result in unrelated UEs being grouped together in a subgroup and, consequently, some UEs needlessly consuming power to monitor POs that are unlikely to include a page directed to that UE (e.g., at a given time). For instance, UE 5 may be located on a different manufacturing line that is not experiencing a fault, but may needlessly be instructed to monitor for a page based at least in part on being clustered and/or grouped with UE 1, resulting in UE 5 consuming additional power to monitor a PO that is unlikely to include a page for the UE 5.

Some techniques and apparatuses described herein provide UE-aided EPI clustering. In some aspects, a UE may transmit a subgroup preference indication that indicates a UE-preferred subgroup of an EPI. To illustrate, the UE may be programmed with, and/or may store in memory, a value that indicates the UE-preferred subgroup. For instance, the UE may be programmed with the value during installation and/or shortly after installation as described below. In some aspects, the UE may receive an EPI subgroup assignment for the EPI, and the EPI subgroup assignment may be based at least in part on the UE-preferred subgroup.

In some aspects, a network node may receive a subgroup preference indication that is associated with a UE, and the subgroup preference indication may indicate a UE-preferred subgroup of an EPI. The network node may select an EPI subgroup that clusters two or more UEs with a same and/or common UE-preferred subgroup. In some aspects, the network node may transmit (e.g., to the UE) an EPI subgroup assignment that is associated with the EPI, and the EPI subgroup assignment may indicate the EPI subgroup to the UE.

A UE indicating a UE-preferred subgroup to a network node may enable the network node to select more optimal subgroups of UEs for EPI transmissions relative to random selection. To illustrate, based at least in part on UE 1, UE 2, UE 3, and UE 4 indicating a same UE-preferred subgroup, the network node may form an EPI subgroup that includes UE 1, UE 2, UE 3, and UE 4 (shown with a dotted pattern) and is more optimal for power saving in the wireless network relative to random subgroup selection. For example, UE 1, UE 2, UE 3, and UE 4 may be positioned at a same manufacturing line as described above, and the network node may indicate paging to UE 1, UE 2, UE 3, and UE 4 without instructing other UEs to monitor for a page. Accordingly, UE-aided selection of UEs in a subgroup (e.g., by way of a UE-preferred subgroup indication) may mitigate the network node transmitting EPIs to UEs that are unlikely to receive a page at a given time, reduce power consumption at UEs (e.g., by mitigating a needless wakeup during a PO), and increase power savings in a wireless network.

As indicated above, FIGS. 5A and 5B are provided as examples. Other examples may differ from what is described with regard to FIGS. 5A and 5B.

Figure 6:
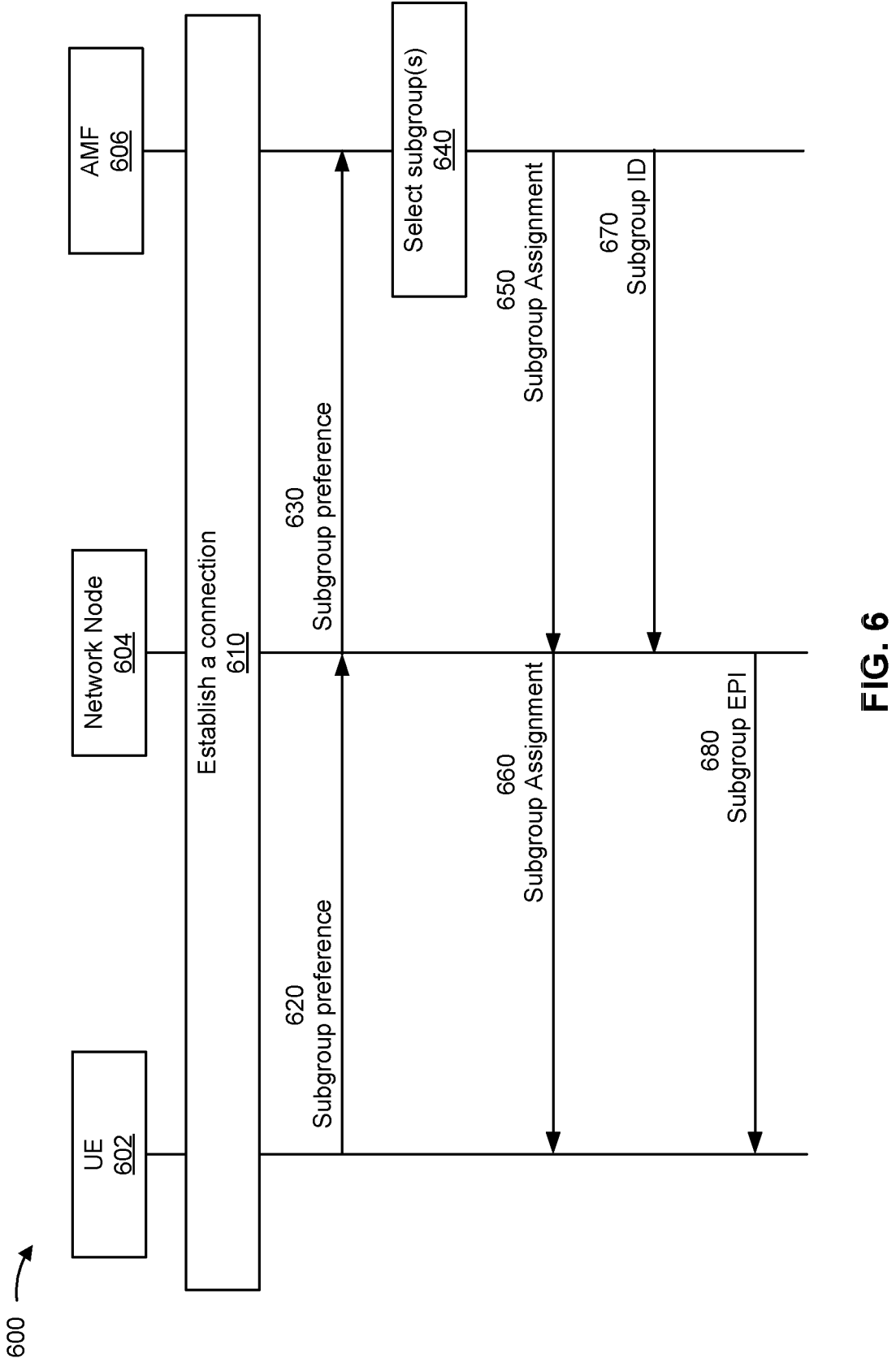
FIG. 6 is a diagram illustrating an example of a wireless communication process between a UE, a network node, and a core network node that is shown as an access and mobility function (AMF), in accordance with the present disclosure.

FIG. 6 is a diagram illustrating an example 600 of a wireless communication process between a UE 602 (e.g., a UE 120), a network node 604 (e.g., a network node 110), and a core network node (e.g., a network controller 130) that is shown as an AMF 606, in accordance with the present disclosure. In some aspects, the example 600 may include one or more actions that may be used for core-network-node-based EPI subgrouping.

As shown by reference number 610, a UE 602, a network node 604, and an AMF 606 may establish a connection. To illustrate, the UE 602 may power up in a cell coverage area provided by the network node 604, and the UE 602 and the network node 604 may perform one or more procedures (e.g., a random access channel (RACH) procedure and/or an RRC procedure) to establish a wireless connection. As another example, the UE 602 may move into the cell coverage area provided by the network node 604 and may perform a handover from a source network node (e.g., another network node 110) to the network node 604. In some aspects, and as part of establishing a connection with the UE 602, the network node 604 may communicate with a core network node (e.g., the AMF 606). To illustrate, and as described below with regard to reference number 620, the UE 602 may communicate, via the network node 604, with a non-access stratum (NAS) protocol layer at the AMF 606.

The network node 604 and the UE 602 may communicate via the connection based at least in part on any combination of Layer 1 signaling (e.g., downlink control information (DCI) and/or uplink control information (UCI)), Layer 2 signaling (e.g., a MAC control element (CE)), and/or Layer 3 signaling (e.g., RRC signaling). To illustrate, the network node 604 may request, via RRC signaling, UE capability information and/or the UE 602 may transmit, via RRC signaling, the UE capability information. Some non-limiting examples of UE capability information may include information that indicates a capability and/or support for core-network-based subgrouping (e.g., EPI subgrouping) as described with regard to the example 600, and/or information that indicates a capability and/or support for UE identifier (ID) based subgrouping as described below with regard to FIG. 7.

As part of establishing a connection, and/or prior to establishing the connection, the network node 604 may broadcast information that is received by the UE 602 and/or used by the UE 602 to communicate with the network node 604. For instance, the network node 604 may broadcast a network node capability and/or a configuration of the network node 604 capability, such as a network node capability of supporting a UE-preferred subgroup indication (e.g., selecting UE-preferred EPI subgroup), configuration information for the UE-preferred subgroups (e.g., a number of EPI subgroups supported by the network node 604 and/or a maximum number of supported subgroups), and/or support for core-network-based EPI subgrouping as described with regard to reference number 640. To illustrate, the network node 604 may transmit a subgroup size indication in a broadcast message (e.g., a SIB), such as a subgroup size indication that specifies the network node 604 supports K EPI subgroups as described with regard to FIGS. 5A and 5B. While described as being transmitted in a broadcast message, other examples may include the network node transmitting the subgroup size indication in a multicast message and/or a unicast message.

As part of communicating via the connection, the network node 604 may transmit configuration information via Layer 3 signaling (e.g., RRC signaling), and activate and/or deactivate a particular configuration via Layer 2 signaling (e.g., a MAC CE) and/or Layer 1 signaling (e.g., DCI). To illustrate, the network node 604 may transmit the configuration information via Layer 3 signaling at a first point in time associated with the UE 602 being tolerant of communication delays, and the network node 604 may transmit an activation of the configuration via Layer 2 signaling and/or Layer 1 signaling at a second point in time associated with the UE 602 being intolerant to communication delays.

As shown by reference number 620, the UE 602 may transmit, and the network node 604 may receive, an indication of subgroup preference. Alternatively, or additionally, the network node 604 may transmit, and the core network node (e.g., the AMF 606) may receive, an indication of the subgroup preference as shown by reference number 630. For clarity, the transmission and/or reception of the indicated subgroup preference is shown in FIG. 6 as being separate from the UE 602, the network node 604, and the AMF 606 establishing a connection as described with regard to reference number 610. However, in some examples, the transmission and reception of the indicated subgroup preference may occur as at least part of the UE 602, the network node 604, and the AMF 606 establishing a connection. For instance, as at least part of establishing the connection as described with regard to reference number 610, the UE 602 may transmit a subgroup preference indication, such as by transmitting the subgroup preference indication as part of a NAS registration procedure and/or in a message directed to a NAS protocol layer at the core network node. Alternatively, or additionally, the UE 602 may transmit the subgroup preference indication in any of L1 signaling (e.g., UCI), L2 signaling (e.g., a MAC CE), and/or L3 signaling (e.g., RRC signaling).

In some aspects, the UE 602 may transmit the subgroup preference indication based at least in part on receiving a capability indication that specifies the network node 604 supports UE-preferred subgrouping and/or based at least in part on receiving a subgroup size indication that specifies a number of EPI subgroups the network node 604 supports (e.g., a subgroup size indication that specifies K EPI subgroups). The subgroup preference indication may specify a UE-preferred subgroup, such as by specifying a value and/or a subgroup ID. For example, a service provider may store the value and/or the subgroup ID at the UE 602 (e.g., in memory at the UE 602) during installation and/or as part of a setup procedure, and the UE 602 may obtain the value and/or subgroup ID from memory. For example, the UE may receive the UE-preferred subgroup via an external input (e.g., an application input, a wireless input mechanism, and/or a wired input mechanism). In some aspects, the value and/or subgroup ID may be a particular value that is selected by the service provider (e.g., not a value assigned by the network node 604). To illustrate, the service provider may form a subgroup of UEs based at least in part on programming the particular value and/or subgroup ID into each UE of the preferred EPI subgroup, and the network node 604 may identify the UEs to select for an EPI subgroup based at least in part on identifying each UE that indicates a same value and/or subgroup ID.

Alternatively, or additionally, the UE 602 may transmit a subgroup preference indication that is based at least in part on a subgroup size indication received from the network node 604. For instance, the UE 602 may select a value is within a range of 1-K values and/or may refrain from selecting a value outside of the range of 1-K.

As shown by reference number 640, the AMF 606 may select one or more subgroups (e.g., EPI subgroups) by selecting the one or more UEs to include in each respective subgroup. In some aspects, the AMF 606 may support UE-preferred subgrouping, and may select a subgroup based at least in part on receiving the subgroup preference indication as described with regard to reference number 620 and reference number 630. Alternatively, or additionally, the AMF 606 may select the subgroup(s) based at least in part on the UE 602 indicating support for core-network-node-based EPI subgrouping (e.g., selected by the AMF 606).

As one example, the AMF 606 may receiving a second subgroup preference indication (e.g., before or after receiving the subgroup preference indication from the UE 602) that is associated with a second UE, and the second subgroup preference indication may specify a same UE-preferred subgroup that is indicated by the UE 602. Accordingly, the AMF 606 may form a subgroup based at least in part on grouping the UE 602 and the second UE in a same EPI subgroup. That is, the AMF 606 may group the UE 602 together with the second UE based at least in part on both UEs specifying a same UE-preferred subgroup and/or a same EPI subgroup preference.

As another example, the second UE may specify a different UE-preferred subgroup than the UE 602. Accordingly, the AMF 606 may assign the UE 602 to a first EPI subgroup and/or may assign the second UE to a second EPI subgroup that is different from the first EPI subgroup based at least in part on the UE 602 and the second UE specifying different UE-preferred subgroups. Thus, an EPI subgroup assignment selected by the AMF 606 may be based at least in part on one or more indicated UE-preferred subgroups.

In some aspects, the AMF 606 may not select an EPI subgroup assignment based at least in part on a UE-preferred subgroup. For example, the AMF 606 may be a legacy AMF that lacks supports for UE-preferred subgrouping. Accordingly, an EPI subgroup assignment may not be based at least in part on a UE-preferred subgroup. For instance, the AMF 606 may instead form subgroups and/or select the EPI subgroup assignment for the UE 602 by using a random selection procedure as described above.

As shown by reference number 650, the AMF 606 may transmit, and the network node 604 may receive, an indication of a subgroup assignment. That is, the AMF 606 may transmit an indication of an EPI subgroup assignment. As shown by FIG. 6, the EPI subgroup assignment may be a core-network-based assignment that is based at least in part on the AMF 606 selecting subgroups and/or assigning an EPI subgroup to one or more UEs. Accordingly, and shown by reference number 660, the network node 604 may transmit, and the UE 602 may receive, an indication of the subgroup assignment.

As shown by reference number 670, the AMF 606 may transmit, and the network node 604 may receive, a subgroup ID. For example, the AMF 606 may transmit an indication of an EPI subgroup that is assigned to the UE 602 to indicate that there is a pending page for the UE 602 and/or for one or more UEs included in the EPI subgroup. Based at least in part on receiving the subgroup ID, and as shown by reference number 680, the network node 604 may transmit, and the UE 602 may receive, a subgroup EPI. For instance, the network node 604 may transmit the EPI using a bitmap, and the bitmap may indicate a pending page by setting a bit that maps to the EPI subgroup assignment (e.g., assigned to the UE 602) to a trigger value as described above. Accordingly, the UE 602 may receive the EPI from the bitmap that is based at least in part on the EPI subgroup assignment.

A UE indicating a UE-preferred subgroup to a network node may enable the network node to select more optimal subgroups of UEs for EPI transmissions relative to random selection. To illustrate, the network node may select a UE-preferred subgroup (e.g., indicated by one or more UEs) that mitigates the network node instructing unrelated UEs to monitor for a page. Accordingly, UE-aided selection of UEs in a subgroup (e.g., by way of a UE-preferred subgroup indication) may mitigate the network node transmitting EPIs to UEs that are unlikely to receive a page at a given time, resulting in reduced power consumption at some UEs (e.g., by mitigating a needless wakeup during a PO), and increased power savings in a wireless network.

As indicated above, FIG. 6 is provided as an example. Other examples may differ from what is described with regard to FIG. 6.

Figure 7:
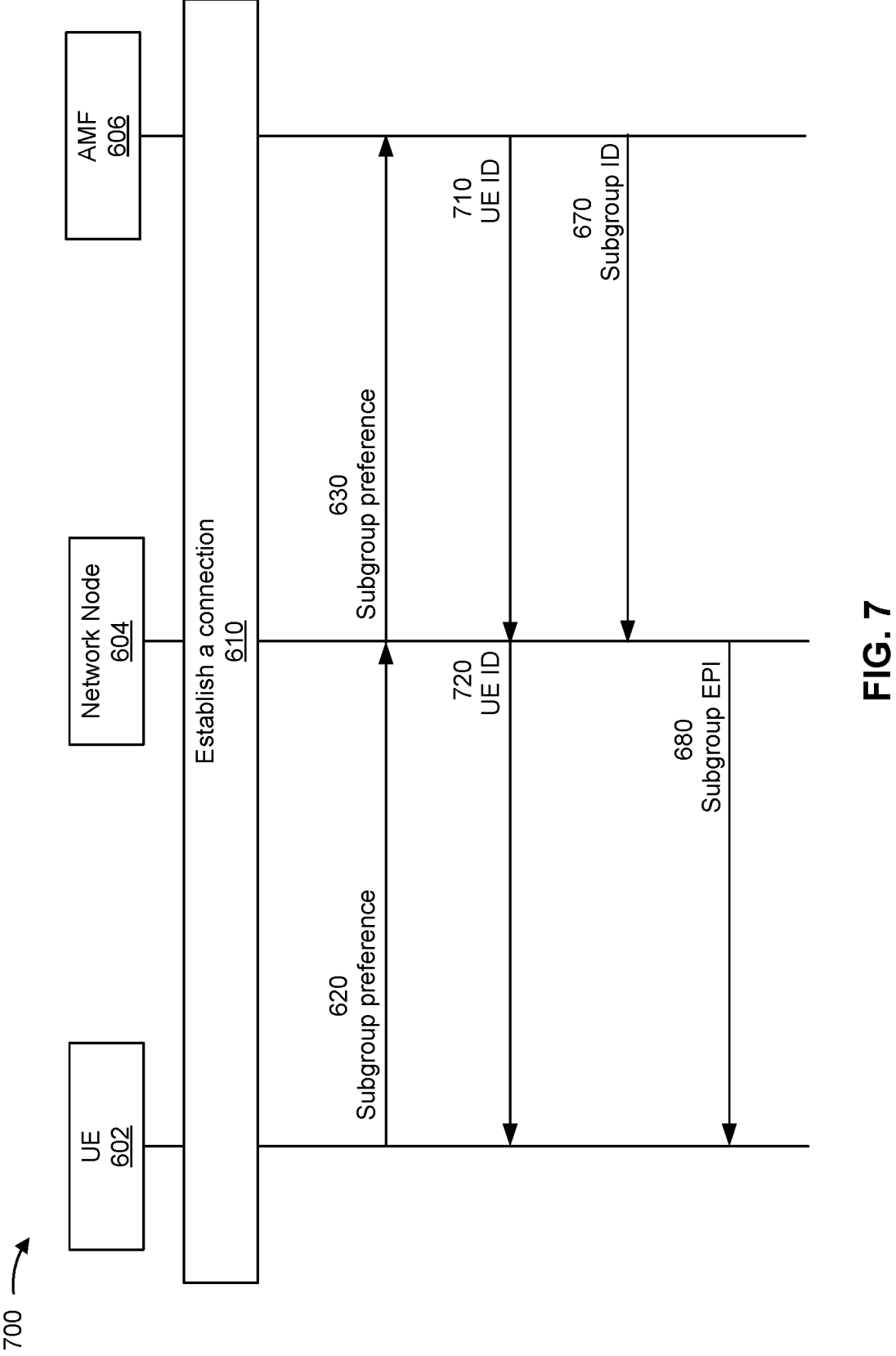
FIG. 7 is a diagram illustrating an example of a wireless communication process between the UE, the network node, and the AMF described with regard to FIG. 6, in accordance with the present disclosure.

FIG. 7 is a diagram illustrating an example 700 of a wireless communication process between the UE 602, the network node 604, and the AMF 606 described with regard to FIG. 6, in accordance with the present disclosure. In some aspects, the example 600 may include one or more actions that may be used for UE-identifier-based EPI subgrouping.

As shown by reference number 610, the UE 602, the network node 604, and the AMF 606 may establish a connection as described with regard to FIG. 6. To illustrate, the network node 604 may transmit a subgroup size indication in a broadcast message (e.g., a SIB), such as a subgroup size indication that specifies the network node 604 supports K EPI subgroups as described. However, in other examples, the network node 604 may not transmit a subgroup size indication, such as in scenarios in which the network node 604 does not support core-network-based EPI subgrouping as described with regard to reference number 640. In some aspects, and as shown by reference number 620, the UE 602 may transmit, and the network node 604 may receive, an indication of subgroup preference. Alternatively, or additionally, the network node 604 may transmit, and the core network node (e.g., the AMF 606) may receive, an indication of the subgroup preference as shown by reference number 630. For clarity, the transmission and/or reception of the indicated subgroup preference is shown in FIG. 7 as being separate from the UE 602, the network node 604, and the AMF 606 establishing a connection. However, in some examples, the transmission and reception of the indicated subgroup preference may occur as at least part of the UE 602, the network node 604, and the AMF 606 establishing a connection, such as during a NAS registration procedure as described with regard to FIG. 6.

As shown by reference number 710, the AMF 606 may transmit, and the network node 604 may receive, an indication of a UE ID, and the UE ID may indicate a subgroup assignment, such as an EPI subgroup assignment. Accordingly, the UE ID may indicate a UE-identifier-based assignment that indicates a subgroup assignment. As one example, the subgroup assignment may be indicated based at least in part on a serving temporary mobile subscriber identity (S-TMSI) that is assigned to the UE 602 by a mobility and management entity (MME) at a core network. In some aspects, the MME may assign an S-TMSI to the UE 602 as an identifier for the UE 602 in a serving cell provided, at least in part, by the network node 604. The MME may communicate the S-TMSI to the AMF 606, and the AMF 606 may forward the S-TMSI to the UE 602. In some scenarios, the MME may assign a common S-TMSI to the UE 602, and the common S-TMSI may be shared with and/or assigned to a group of UEs. For instance, the UE 602 and one or more other UEs may transition to an idle state, inactive state, and/or a DRX mode, and the MME may assign a common S-TMSI to the group of UEs operating in the idle state, inactive state, and/or DRX mode. In some aspects, the MME may assign a common S-TMSI to one or more UEs that have indicated a same UE-preferred subgroup as described with regard to reference number 620 and reference number 630. Thus, the MME may enable UE-preferred EPI subgrouping based at least in part on assigning a common S-TMSI to the UEs included in the UE-preferred subgroup. Accordingly, and shown by reference number 720, the network node 604 may transmit, and the UE 602 may receive, an indication of the subgroup assignment that is based at least in part on a UE ID (e.g., the S-TMSI).

As shown by reference number 670, the AMF 606 may transmit, and the network node 604 may receive, a subgroup ID. Based at least in part on receiving the subgroup ID, and as shown by reference number 660, the network node 604 may transmit, and the UE 602 may receive, a subgroup EPI.

A UE indicating a UE-preferred subgroup to a network node may enable the network node to select more optimal subgroups of UEs for EPI transmissions relative to random selection. To illustrate, the network node may select a UE-preferred subgroup (e.g., indicated by one or more UEs) that mitigates the network node instructing unrelated UEs to monitor for a page. Accordingly, UE-aided selection of UEs in a subgroup (e.g., by way of a UE-preferred subgroup indication) may mitigate the network node transmitting EPIs to UEs that are unlikely to receive a page at a given time, resulting in reduced power consumption at some UEs (e.g., by mitigating a needless wakeup during a PO), and increased power savings in a wireless network.

As indicated above, FIG. 7 is provided as an example. Other examples may differ from what is described with regard to FIG. 7.

Figure 8:
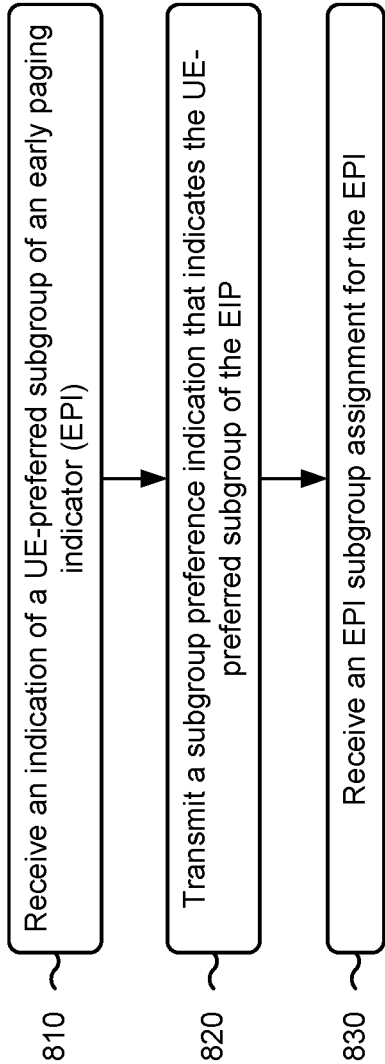
FIG. 8 is a diagram illustrating an example process performed, for example, at a UE or an apparatus of a UE, in accordance with the present disclosure.

FIG. 8 is a diagram illustrating an example process 800 performed, for example, at a UE or an apparatus of a UE, in accordance with the present disclosure. Example process 800 is an example where the apparatus or the UE (e.g., UE 120) performs operations associated with UE-aided EPI clustering.

As shown in FIG. 8, in some aspects, process 800 may include receiving an indication of a UE-preferred subgroup of an EPI (block 810). For example, the UE (e.g., using reception component 1002 and/or communication manager 1006, depicted in FIG. 10) may receive a subgroup preference indication that indicates a UE-preferred subgroup of an EPI, as described above. For example, the UE may receive the UE-preferred subgroup via an external input.

As further shown in FIG. 8, in some aspects, process 800 may include transmitting a subgroup preference indication that indicates a UE-preferred subgroup of an EPI (block 820). For example, the UE (e.g., using transmission component 1004 and/or communication manager 1006, depicted in FIG. 10) may transmit a subgroup preference indication that indicates a UE-preferred subgroup of an EPI, as described above.

As further shown in FIG. 8, in some aspects, process 800 may include receiving an EPI subgroup assignment for the EPI (block 830). For example, the UE (e.g., using reception component 1002 and/or communication manager 1006, depicted in FIG. 10) may receive an EPI subgroup assignment for the EPI, as described above.

Process 800 may include additional aspects, such as any single aspect or any combination of aspects described below and/or in connection with one or more other processes described elsewhere herein.

In a first aspect, transmitting the subgroup preference indication includes transmitting the subgroup preference indication as part of a NAS registration procedure.

In a second aspect, process 800 includes receiving a subgroup size indication that specifies that a network node supports K EPI subgroups, K being an integer, and the subgroup preference indication is based at least in part on the subgroup size indication.

In a third aspect, receiving the subgroup size indication includes receiving the subgroup size indication in a broadcast message.

In a fourth aspect, the broadcast message includes a system information block.

In a fifth aspect, the EPI subgroup assignment includes a core network-based assignment.

In a sixth aspect, the core network-based assignment includes an AMF-based assignment.

In a seventh aspect, the EPI subgroup assignment includes a UE-identifier-based assignment.

In an eighth aspect, the UE-identifier-based assignment is based at least in part on a S-TMSI.

In a ninth aspect, the subgroup preference indication includes a value stored at the UE.

In a tenth aspect, process 800 includes receiving, prior to transmitting the subgroup preference indication, the value as input.

In an eleventh aspect, transmitting the subgroup preference indication includes transmitting the subgroup preference indication in a MAC CE.

In a twelfth aspect, receiving the EPI includes receiving the EPI using a bitmap that is based at least in part on the EPI subgroup assignment.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
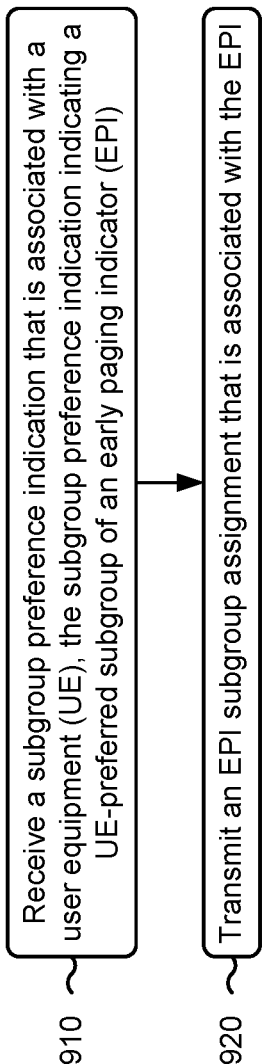
FIG. 9 is a diagram illustrating an example process performed, for example, at a network node or an apparatus of a network node, in accordance with the present disclosure.

FIG. 9 is a diagram illustrating an example process 900 performed, for example, at a network node or an apparatus of a network node, in accordance with the present disclosure. Example process 900 is an example where the apparatus or the network node (e.g., network node 110) performs operations associated with UE-aided EPI clustering.

As shown in FIG. 9, in some aspects, process 900 may include receiving a subgroup preference indication that is associated with a UE, the subgroup preference indication indicating a UE-preferred subgroup of an EPI (block 910). For example, the network node (e.g., using reception component 1102 and/or communication manager 1106, depicted in FIG. 11) may receive a subgroup preference indication that is associated with a UE, the subgroup preference indication indicating a UE-preferred subgroup of an EPI, as described above.

As further shown in FIG. 9, in some aspects, process 900 may include transmitting an EPI subgroup assignment that is associated with the EPI (block 920). For example, the network node (e.g., using transmission component 1104 and/or communication manager 1106, depicted in FIG. 11) may transmit an EPI subgroup assignment that is associated with the EPI, as described above.

Process 900 may include additional aspects, such as any single aspect or any combination of aspects described below and/or in connection with one or more other processes described elsewhere herein.

In a first aspect, receiving the subgroup preference indication includes receiving the subgroup preference indication in a MAC CE.

In a second aspect, process 900 includes transmitting the EPI using a bitmap that is based at least in part on using the EPI subgroup assignment.

In a third aspect, the EPI subgroup assignment is based at least in part on the UE-preferred subgroup.

In a fourth aspect, the UE is a first UE, the subgroup preference indication is a first subgroup preference indication that is associated with the first UE, and process 900 includes receiving a second subgroup preference indication that is associated with a second UE, the second subgroup preference indication specifying the UE-preferred subgroup indicated by the first subgroup preference indication, and grouping the first UE and the second UE in a same EPI subgroup based at least in part on the first subgroup preference indication and the second subgroup preference indication specifying a same EPI subgroup preference.

In a fifth aspect, the EPI subgroup assignment is not based on the UE-preferred subgroup.

In a sixth aspect, the UE is a first UE, the subgroup preference indication is a first subgroup preference indication that is associated with the first UE, the UE-preferred subgroup is a first UE-preferred subgroup, and process 900 includes receiving a second subgroup preference indication that is associated with a second UE, the second subgroup preference indication specifying a second UE-preferred subgroup that is different from the first UE-preferred subgroup, assigning the first UE to a first EPI subgroup, and assigning the second UE to a second EPI subgroup that is different from the first EPI subgroup based at least in part on the first UE-preferred subgroup being different from the second UE-preferred subgroup.

In a seventh aspect, transmitting the subgroup preference indication includes receiving the subgroup preference indication as part of a NAS registration procedure.

In an eighth aspect, process 900 includes transmitting a subgroup size indication that specifies support for K EPI subgroups, K being an integer.

In a ninth aspect, receiving the subgroup size indication includes transmitting the subgroup size indication in a broadcast message.

In a tenth aspect, the broadcast message includes a system information block.

In an eleventh aspect, the EPI subgroup assignment includes a core-network-based assignment.

In a twelfth aspect, the core-network-based assignment includes an access and mobility function-based assignment.

In a thirteenth aspect, the EPI subgroup assignment includes a UE-identifier-based assignment.

In a fourteenth aspect, the UE identifier includes a S-TMSI.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
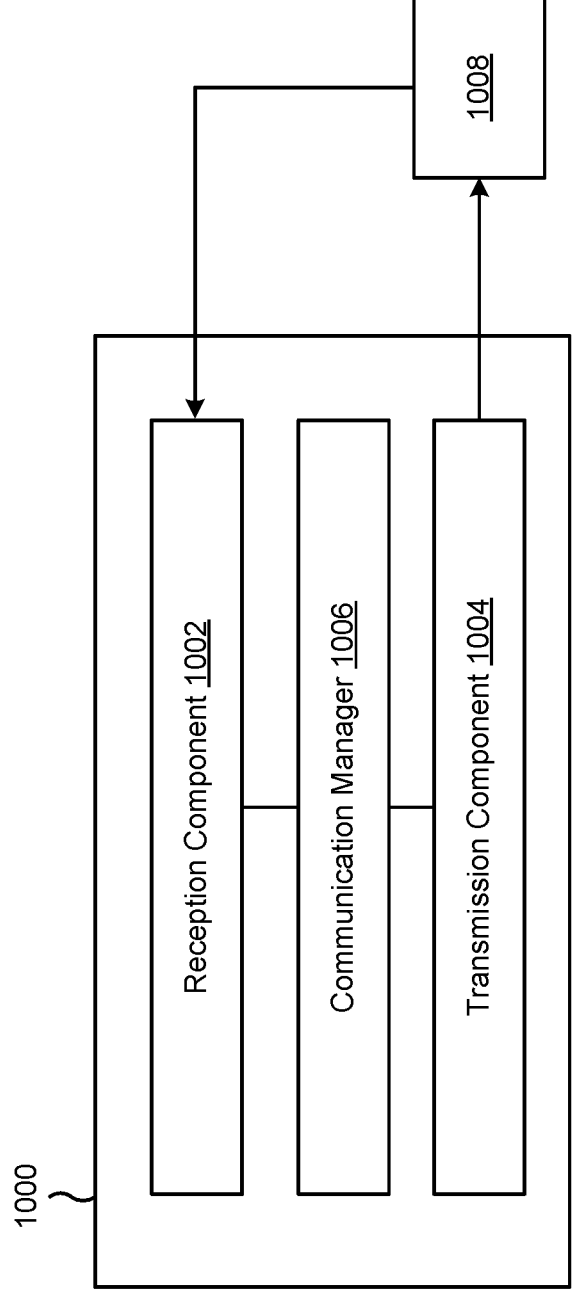
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 140 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIGS. 5A-7. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, one or more modems, one or more demodulators, one or more MIMO detectors, one or more receive processors, one or more controllers/processors, one or more memories, or a combination thereof, of the UE described in connection with FIG. 2.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, one or more modems, one or more modulators, one or more transmit MIMO processors, one or more transmit processors, one or more controllers/processors, one or more memories, or a combination thereof, of the UE described in connection with FIG. 2. In some aspects, the transmission component 1004 may be co-located with the reception component 1002 in one or more transceivers.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The transmission component 1004 may transmit a subgroup preference indication that indicates a UE-preferred subgroup of an EPI. The reception component 1002 may receive an EPI subgroup assignment for the EPI. Alternatively, or additionally, the reception component 1002 may receive a subgroup size indication that specifies that a network node supports K EPI subgroups, K being an integer, and the subgroup preference indication is based at least in part on the subgroup size indication. In some aspects, the reception component 1002 may receive, prior to transmitting the subgroup preference indication, a value of the UE-preferred subgroup as input.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
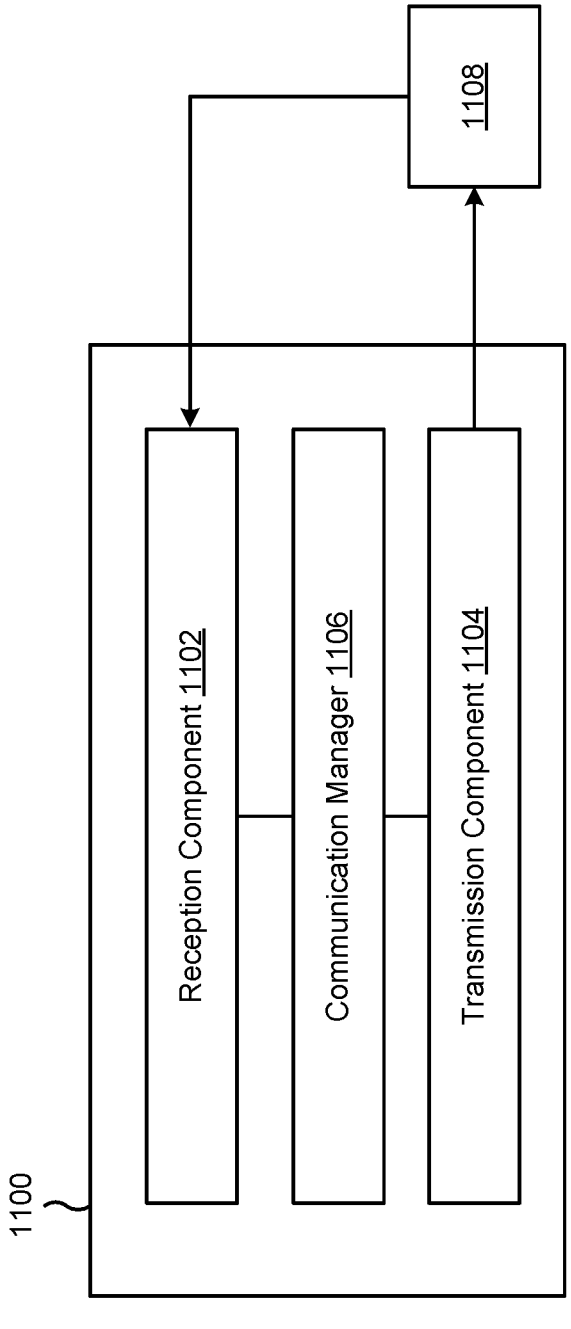
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a network node, or a network node may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 150 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIGS. 5A-7. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, one or more modems, one or more demodulators, one or more MIMO detectors, one or more receive processors, one or more controllers/processors, one or more memories, or a combination thereof, of the network node described in connection with FIG. 2. In some aspects, the reception component 1102 and/or the transmission component 1104 may include or may be included in a network interface. The network interface may be configured to obtain and/or output signals for the apparatus 1100 via one or more communications links, such as a backhaul link, a midhaul link, and/or a fronthaul link.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, one or more modems, one or more modulators, one or more transmit MIMO processors, one or more transmit processors, one or more controllers/processors, one or more memories, or a combination thereof, of the network node described in connection with FIG. 2. In some aspects, the transmission component 1104 may be co-located with the reception component 1102 in one or more transceivers.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The reception component 1102 may receive a subgroup preference indication that is associated with a UE, the subgroup preference indication indicating a UE-preferred subgroup of an EPI. The transmission component 1104 may transmit an EPI subgroup assignment that is associated with the EPI. In some aspects, the transmission component 1104 may transmit the EPI using a bitmap that is based at least in part on using the EPI subgroup assignment. Alternatively, or additionally, the transmission component 1104 may transmit a subgroup size indication that specifies support for K EPI subgroups, K being an integer.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: transmitting a subgroup preference indication that indicates a UE-preferred subgroup of an early paging indicator (EPI); and receiving an EPI subgroup assignment for the EPI.

Aspect 2: The method of Aspect 1, wherein transmitting the subgroup preference indication comprises: transmitting the subgroup preference indication as part of a non-access stratum (NAS) registration procedure.

Aspect 3: The method of any of Aspects 1-2, further comprising: receiving a subgroup size indication that specifies that a network node supports K EPI subgroups, K being an integer, wherein the subgroup preference indication is based at least in part on the subgroup size indication.

Aspect 4: The method of Aspect 3, wherein receiving the subgroup size indication comprises: receiving the subgroup size indication in a broadcast message.

Aspect 5: The method of Aspect 4, wherein the broadcast message comprises a system information block.

Aspect 6: The method of any of Aspects 1-5, wherein the EPI subgroup assignment comprises a core network-based assignment.

Aspect 7: The method of Aspect 6, wherein the core network-based assignment comprises an access and mobility function (AMF)-based assignment.

Aspect 8: The method of any of Aspects 1-7, wherein the EPI subgroup assignment comprises a UE-identifier-based assignment.

Aspect 9: The method of Aspect 8, wherein the UE-identifier-based assignment is based at least in part on a serving temporary mobile subscriber identity (S-TMSI).

Aspect 10: The method of any of Aspects 1-9, wherein the subgroup preference indication comprises a value stored at the UE.

Aspect 11: The method of Aspect 10, further comprising: receiving, prior to transmitting the subgroup preference indication, the value as input.

Aspect 12: The method of any of Aspects 1-11, wherein transmitting the subgroup preference indication comprises: transmitting the subgroup preference indication in a medium access control (MAC) control element (CE).

Aspect 13: The method of any of Aspects 1-12, wherein receiving the EPI comprises: receiving the EPI using a bitmap that is based at least in part on the EPI subgroup assignment.

Aspect 14: A method of wireless communication performed by a network node, comprising: receiving a subgroup preference indication that is associated with a user equipment (UE), the subgroup preference indication indicating a UE-preferred subgroup of an early paging indicator (EPI); and transmitting an EPI subgroup assignment that is associated with the EPI.

Aspect 15: The method of Aspect 14, wherein receiving the subgroup preference indication comprises: receiving the subgroup preference indication in a medium access control (MAC) control element (CE).

Aspect 16: The method of any of Aspects 14-15, further comprising: transmitting the EPI using a bitmap that is based at least in part on using the EPI subgroup assignment.

Aspect 17: The method of any of Aspects 14-16, wherein the EPI subgroup assignment is based at least in part on the UE-preferred subgroup.

Aspect 18: The method of any of Aspects 14-17, wherein the UE is a first UE, wherein the subgroup preference indication is a first subgroup preference indication that is associated with the first UE, and wherein the method further comprises: receiving a second subgroup preference indication that is associated with a second UE, the second subgroup preference indication specifying the UE-preferred subgroup indicated by the first subgroup preference indication; and grouping the first UE and the second UE in a same EPI subgroup based at least in part on the first subgroup preference indication and the second subgroup preference indication specifying a same EPI subgroup preference.

Aspect 19: The method of any of Aspects 14-18, wherein the EPI subgroup assignment is not based on the UE-preferred subgroup.

Aspect 20: The method of any of Aspects 14-19, wherein the UE is a first UE, wherein the subgroup preference indication is a first subgroup preference indication that is associated with the first UE, wherein the UE-preferred subgroup is a first UE-preferred subgroup, and wherein the method further comprises: receiving a second subgroup preference indication that is associated with a second UE, the second subgroup preference indication specifying a second UE-preferred subgroup that is different from the first UE-preferred subgroup; assigning the first UE to a first EPI subgroup; and assigning the second UE to a second EPI subgroup that is different from the first EPI subgroup based at least in part on the first UE-preferred subgroup being different from the second UE-preferred subgroup.

Aspect 21: The method of any of Aspects 14-20, wherein transmitting the subgroup preference indication comprises: receiving the subgroup preference indication as part of a non-access stratum (NAS) registration procedure.

Aspect 22: The method of any of Aspects 14-21, further comprising: transmitting a subgroup size indication that specifies support for K EPI subgroups, K being an integer.

Aspect 23: The method of Aspect 22, wherein receiving the subgroup size indication comprises: transmitting the subgroup size indication in a broadcast message.

Aspect 24: The method of Aspect 23, wherein the broadcast message comprises a system information block.

Aspect 25: The method of any of Aspects 14-24, wherein the EPI subgroup assignment comprises a core-network-based assignment.

Aspect 26: The method of Aspect 25, wherein the core-network-based assignment comprises an access and mobility function-based assignment.

Aspect 27: The method of any of Aspects 14-26, wherein the EPI subgroup assignment comprises a UE-identifier-based assignment.

Aspect 28: The method of Aspect 27, wherein the UE identifier comprises a serving temporary mobile subscriber identity (S-TMSI).

Aspect 29: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-13.

Aspect 30: An apparatus for wireless communication at a device, the apparatus comprising one or more memories and one or more processors coupled to the one or more memories, the one or more processors configured to cause the device to perform the method of one or more of Aspects 1-13.

Aspect 31: An apparatus for wireless communication, the apparatus comprising at least one means for performing the method of one or more of Aspects 1-13.

Aspect 32: A non-transitory computer-readable medium storing code for wireless communication, the code comprising instructions executable by one or more processors to perform the method of one or more of Aspects 1-13.

Aspect 33: A non-transitory computer-readable medium storing a set of instructions for wireless communication, the set of instructions comprising one or more instructions that, when executed by one or more processors of a device, cause the device to perform the method of one or more of Aspects 1-13.

Aspect 34: A device for wireless communication, the device comprising a processing system that includes one or more processors and one or more memories coupled with the one or more processors, the processing system configured to cause the device to perform the method of one or more of Aspects 1-13.

Aspect 35: An apparatus for wireless communication at a device, the apparatus comprising one or more memories and one or more processors coupled to the one or more memories, the one or more processors individually or collectively configured to cause the device to perform the method of one or more of Aspects 1-13.

Aspect 36: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 14-28.

Aspect 37: An apparatus for wireless communication at a device, the apparatus comprising one or more memories and one or more processors coupled to the one or more memories, the one or more processors configured to cause the device to perform the method of one or more of Aspects 14-28.

Aspect 38: An apparatus for wireless communication, the apparatus comprising at least one means for performing the method of one or more of Aspects 14-28.

Aspect 39: A non-transitory computer-readable medium storing code for wireless communication, the code comprising instructions executable by one or more processors to perform the method of one or more of Aspects 14-28.

Aspect 40: A non-transitory computer-readable medium storing a set of instructions for wireless communication, the set of instructions comprising one or more instructions that, when executed by one or more processors of a device, cause the device to perform the method of one or more of Aspects 14-28.

Aspect 41: A device for wireless communication, the device comprising a processing system that includes one or more processors and one or more memories coupled with the one or more processors, the processing system configured to cause the device to perform the method of one or more of Aspects 14-28.

Aspect 42: An apparatus for wireless communication at a device, the apparatus comprising one or more memories and one or more processors coupled to the one or more memories, the one or more processors individually or collectively configured to cause the device to perform the method of one or more of Aspects 14-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE), comprising:
one or more antennas; and
a processing system, coupled with the one or more antennas, that includes one or more processors and one or more memories that store code for the one or more processors, the processing system configured to cause the UE to:
receive an indication that a network node supports UE-preferred subgrouping;
transmit, based at least in part on the indication that the network node supports UE-preferred subgrouping, a subgroup preference indication that indicates a UE-preferred subgroup of an early paging indicator (EPI),
wherein the subgroup preference indication specifies at least one of a value or a subgroup ID; and
receive an EPI subgroup assignment for the EPI.

2. The UE of claim 1, wherein the processing system, to cause the UE to transmit the subgroup preference indication, is configured to cause the UE to:
transmit the subgroup preference indication as part of a non-access stratum (NAS) registration procedure.

3. The UE of claim 1, wherein the processing system is further configured to cause the UE to:
receive a subgroup size indication that specifies that the network node supports K EPI subgroups, K being an integer,
wherein the subgroup preference indication is based at least in part on the subgroup size indication.

4. The UE of claim 3, wherein the processing system, to cause the UE to receive the subgroup size indication, is configured to cause the UE to:
receive the subgroup size indication in a broadcast message.

5. The UE of claim 4, wherein the broadcast message comprises a system information block.

6. The UE of claim 1, wherein the EPI subgroup assignment comprises a core network-based assignment.

7. The UE of claim 6, wherein the core network-based assignment comprises an access and mobility function (AMF)-based assignment.

8. The UE of claim 1, wherein the EPI subgroup assignment comprises a UE-identifier-based assignment.

9. The UE of claim 8, wherein the UE-identifier-based assignment is based at least in part on a serving temporary mobile subscriber identity (S-TMSI).

10. The UE of claim 1, wherein the processing system is configured to cause the UE to:

receive the EPI using a bitmap that is based at least in part on the EPI subgroup assignment.

11. A network node, comprising:

one or more antennas; and a processing system, coupled with the one or more antennas, that includes one or more processors and one or more memories that store code for the one or more processors, the processing system configured to cause the network node to:

receive a first subgroup preference indication that is associated with a first user equipment (UE), the first subgroup preference indication indicating a first UE-preferred subgroup of an early paging indicator (EPI);

receive a second subgroup preference indication that is associated with a second UE, the second subgroup preference indication specifying the first UE-preferred subgroup or a second UE-preferred subgroup of the EPI; and transmit an EPI subgroup assignment that is associated with the EPI.

12. The network node of claim 11, wherein the processing system is further configured to cause the network node to:

transmit the EPI using a bitmap that is based at least in part on using the EPI subgroup assignment.

13. The network node of claim 11, wherein the EPI subgroup assignment is based at least in part on the first UE-preferred subgroup.

14. The network node of claim 11, wherein the second subgroup preference indication specifies the first UE-preferred subgroup, and wherein the processing system is further configured to cause the network node to:

group the first UE and the second UE in a same EPI subgroup based at least in part on the first subgroup preference indication and the second subgroup preference indication specifying the first UE-preferred subgroup.

15. The network node of claim 11, wherein the EPI subgroup assignment is not based on the first UE-preferred subgroup.

16. The network node of claim 11, wherein the second subgroup preference indication specifies the second UE-preferred subgroup, and wherein the processing system is further configured to cause the network node to:

assign the first UE to a first EPI subgroup; and assign the second UE to a second EPI subgroup that is different from the first EPI subgroup based at least in part on the first UE-preferred subgroup being different from the second UE-preferred subgroup.

17. The network node of claim 11, wherein the processing system, to cause the network node to receive the first subgroup preference indication, is configured to cause the network node to:

receive the first subgroup preference indication as part of a non-access stratum (NAS) registration procedure.

18. The network node of claim 11, wherein the processing system is further configured to cause the network node to:

transmit a subgroup size indication that specifies support for K EPI subgroups, K being an integer.

19. The network node of claim 11, wherein the EPI subgroup assignment comprises a core-network-based assignment.

20. The network node of claim 11, wherein the EPI subgroup assignment comprises a UE-identifier-based assignment.

21. A method of wireless communication performed by a user equipment (UE), comprising:

receiving an indication that a network node supports UE-preferred subgrouping;

transmitting, based at least in part on the indication that the network node supports UE-preferred subgrouping, a subgroup preference indication that indicates a UE-preferred subgroup of an early paging indicator (EPI), wherein the subgroup preference indication specifies at least one of a value or a subgroup ID; and receiving an EPI subgroup assignment for the EPI.

22. The method of claim 21, wherein transmitting the subgroup preference indication comprises:

transmitting the subgroup preference indication as part of a non-access stratum (NAS) registration procedure.

23. The method of claim 21, wherein the EPI subgroup assignment comprises a core network-based assignment.

24. The method of claim 21, wherein the EPI subgroup assignment comprises a UE-identifier-based assignment.

25. The method of claim 21, wherein receiving the EPI comprises:

receiving the EPI using a bitmap that is based at least in part on the EPI subgroup assignment.

26. A method of wireless communication performed by a network node, comprising:

receiving a first subgroup preference indication that is associated with a first user equipment (UE), the first subgroup preference indication indicating a first UE-preferred subgroup of an early paging indicator (EPI);

receiving a second subgroup preference indication that is associated with a second UE, the second subgroup preference indication specifying the first or a second UE-preferred subgroup; and transmitting an EPI subgroup assignment that is associated with the EPI.

27. The method of claim 26, further comprising:

transmitting the EPI using a bitmap that is based at least in part on using the EPI subgroup assignment.

28. The method of claim 26, wherein the EPI subgroup assignment is based at least in part on the first UE-preferred subgroup.

29. The method of claim 26, wherein the second subgroup preference indication specifies the first UE-preferred subgroup indicated by the first subgroup preference indication, and wherein the method further comprises:

grouping the first UE and the second UE in a same EPI subgroup based at least in part on the first subgroup preference indication and the second subgroup preference indication specifying a same EPI subgroup preference.

30. The method of claim 26, wherein the second subgroup preference indication specifies the second UE-preferred subgroup that is different from the first UE-preferred subgroup, and wherein the method further comprises:

assigning the first UE to a first EPI subgroup; and assigning the second UE to a second EPI subgroup that is different from the first EPI subgroup based at least in part on the first UE-preferred subgroup being different from the second UE-preferred subgroup.

\* \* \* \* \*